A. N. AND O. E. FREED.
COMBINATION FLASH LIGHT AND TOILET ARTICLE.
APPLICATION FILED FEB. 28, 1919.
1,321,026.
Patented Nov. 4, 1919.
2 SHEETS—SHEET 1.
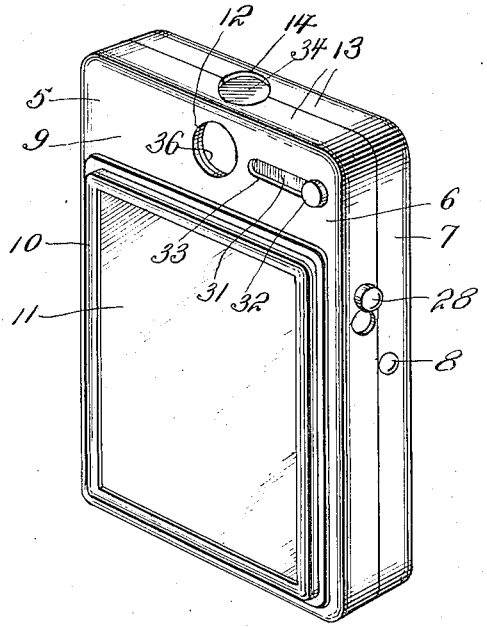
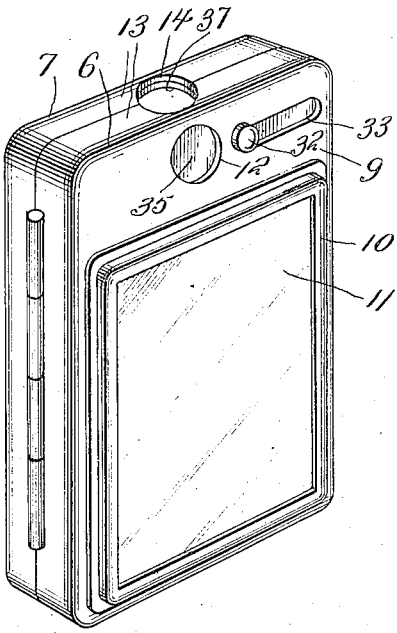
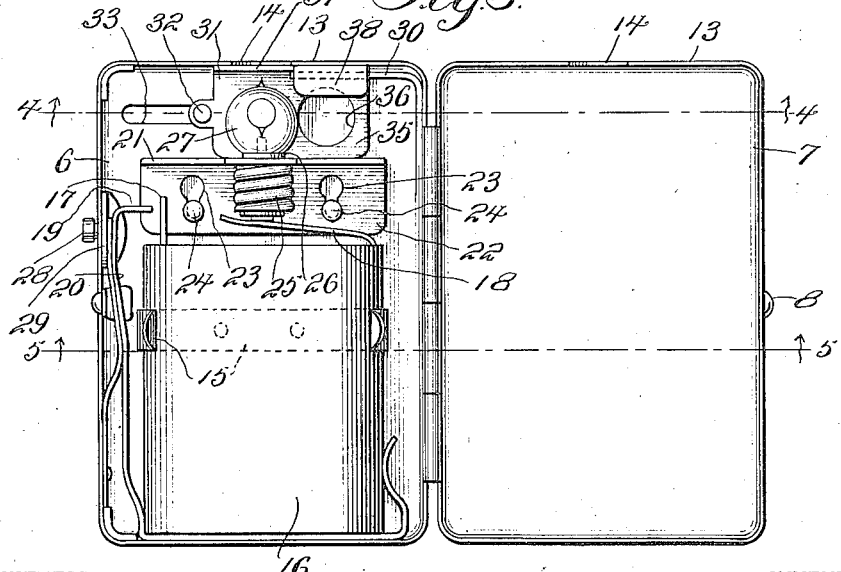
WITNESS:
INVENTOR.
Adolph N. Freed
BY Oscar E. Freed
ATTORNEY.

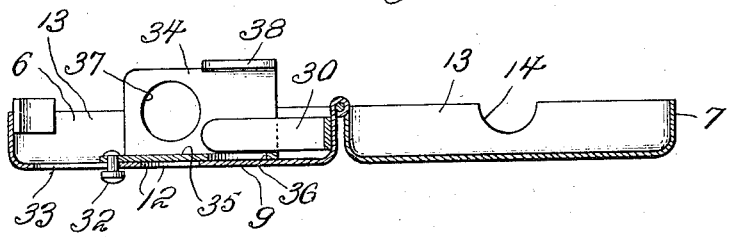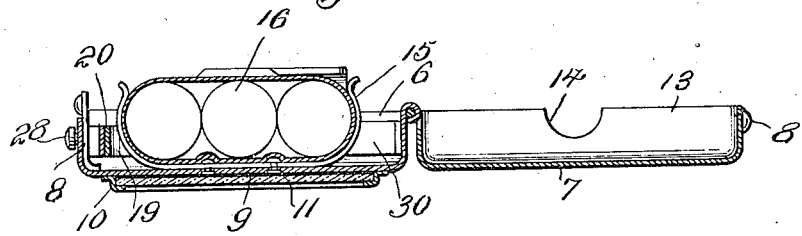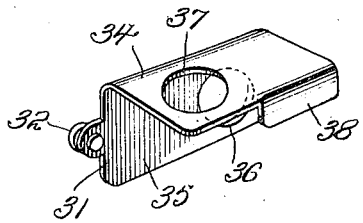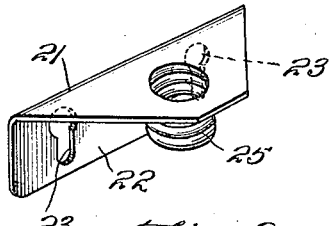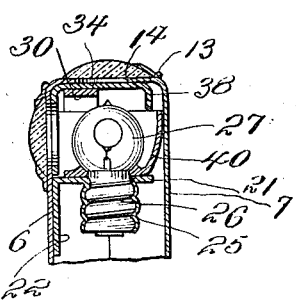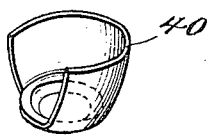

UNITED STATES PATENT OFFICE.

ADOLPH N. FREED AND OSCAR E. FREED, OF ROCKFORD, ILLINOIS.

COMBINATION FLASH-LIGHT AND TOILET ARTICLE.

1,321,026.             Specification of Letters Patent.        Patented Nov. 4, 1919.

Application filed February 28, 1919. Serial No. 279,707.

*To all whom it may concern:*

Be it known that we, ADOLPH N. FREED and OSCAR E. FREED, citizens of the United States, residing at Rockford, in the county of Winnebago and State of Illinois, have invented new and useful Improvements in Combination Flash-Lights and Toilet Articles, of which the following is a specification.

This invention relates to flash lights, and has for its object the provision of a device which may be used in the ordinary manner as a flash light and which has one side provided with a mirror and an opening through which light may be directed upon the user's face so that he may make effective use of the mirror for self inspection even in the dark.

An important object is the provision of a device of this character which is provided with a plurality of light admitting openings which are selectively open or closed by means of a slidable plate disposed within the device and operable at the will of the operator depending upon for what purpose the device is to be employed.

Another object is the provision of a device of this character which is so constructed that any ordinary style or size, within reasonable limits, of dry cell may be used therein, the interior parts of the device being so formed as to accommodate themselves to such variations.

A further object is the provision of a device of this character which will be simple and inexpensive in manufacture, highly efficient and durable in use and a general improvement in the art.

With the above and other objects and advantages in view, the invention consists in the details of construction to be hereinafter more fully described and claimed, and illustrated in the accompanying drawings, in which:—

Figure 1 is a perspective view of the device in closed position showing the slide at one limit of its movement.

Fig. 2 is a similar view showing the slide at the other limit of its movement.

Fig. 3 is an elevation looking at the inside of the casing, the cover being open.

Fig. 4 is a cross sectional view taken on the line 4—4 of Fig. 3.

Fig. 5 is a cross sectional view on the line 5—5 of Fig. 3.

Fig. 6 is a perspective view of the sliding plate removed.

Fig. 7 is a perspective view of the slidably mounted socket.

Fig. 8 is a detail view showing a reflector associated with the bulb, and

Fig. 9 is a perspective view of the reflector.

Referring more particularly to the drawings, the numeral 5 designates a preferably rectangular casing formed of a body portion 6 to which is hingedly secured a cover 7 provided with any suitable catch 8. Secured upon the front wall 9 of the body 5 is a frame 10 within which is disposed a mirror 11. This frame 10 is shown as rigidly secured to the casing but it may be made detachable, if desired, this detail being considered unimportant. The front wall 9 is further provided above the mirror with a circular hole 12 for a purpose to be described. The end walls 13 of the body 6 and cover 7 are provided with semi-circular recesses which register and combine to form a circular hole 14 when the cover is in closed position.

Secured upon the inside of the front wall 9 by any suitable means, such as soldering or rivets is a spring clip 15 adapted to embracingly engage a dry battery 16 of the type commonly used in ordinary flashlights. The battery 16 is provided with the usual contact 17 and 18 and is so positioned within the casing that the contact 17 will be disposed adjacent the free edge of the body 6 in position to be engaged by the angularly extending end 19 and a resilient strip 20 secured upon the body 6.

Disclosed within the body 6 below the hole 12 in the front wall thereof is a plate 21 having a right angularly extending flange 22 disposed against the inside of the front wall 9 and provided with a half spaced slot 23 slidably engaged upon studs 24 extending from the front wall. The plate 21 has formed thereon a socket member 25 which is threaded for engagement therein of the threaded stem 28 of a small incandescent lamp 27. The plate 21 is so positioned that the socket member 25 will be engaged by the long contact member 18 of the battery 16. By virtue of the engagement of the stud 24 within the slots 23, it will be seen that the plate 21 carrying the incandescent lamp will have a certain degree of movement longitudinally of the casing whereby to accommodate dry batteries of different lengths while still maintaining contact between the long contact member of the battery and the socket carried by the plate 21.

Extending through the free edge of the body 6 is a button 28 provided on its inner end with a plate 29 engaging against the strip 20 whereby the strip 20 may be so moved that the angular ends 19 thereon will engage the contact 17 on the dry battery. From this construction it will be seen that when the operator presses upon the button 28 a circuit will be closed through the dry battery and lamp for energizing the lamp exactly in the same manner as in an ordinary flash light.

Secured upon the hinged edges of the body 6 is a strip 30 which extends in slightly spaced relation to the end wall 13 of the body to form a guide. Disposed within the casing adjacent the end walls 13 of the body and cover is an angular plate 31 slidable between the end walls 13 of the body and the guide strips 30. A button 32 extends from the angular plate 31 and is slidably engaged within a slot 33 formed in the front wall 9 adjacent the hole 12 therein. The slide 31 is formed of two plates 34 and 35 bearing respectively against the end wall 13 and the front wall 9. The plate 35 is provided with a circular hole 36 adapted to register with the hole 12 when the slide is at one limit of its movement and the plate 34 is provided with a hole 37 registering with the hole 14 when the slide is at the other limit of its movement. The plate portion 34 of the slide has furthermore formed thereon a lateral extension 38 disposed in alinement with the holes 37 whereby to serve as a reflector when positioned behind the lamp 26.

The use of the device is as follows:—
With the battery 16 and lamp 27 in position as above described, and the cover 7 in closed position, when the operator desires to use the device as a flashlight it is merely necessary that he grasp the casing 5 in his hand and by engaging his thumb upon the button 32 move the slide 31 so that the holes 37 in the plate 34 of the slide will register with the hole 14 in the end of the casing. When he then presses upon the button 28 the lamp will be energized, as previously described, and light will be emitted through the registering holes 14 and 37. If desired, it is understood that a suitable lamp may be disposed to cover the hole 14. In case the operator desires to use the device for self inspection, it is merely necessary that he place his thumb upon the button 32 and move the slide 31 in the other direction so that the hole 36 in the plate 35 will register with the hole 12 in the front wall 9 of the casing. The operator then holds the device before his face and presses upon the button 28 to energize the lamp whereupon the light will be emitted through the registering holes 12 and 36 and will shine upon his face so that he may readily inspect himself in the mirror 11. When the device is used in this last mentioned manner, it will be apparent that the extension 38 on the slide will be disposed to a slight extent behind the bulb 27 and will consequently serve as a reflector for directing the rays of light through the registering holes 36 and 12.

If desired, the hole in the end of the casing may be covered by a bull's eye lens such as is commonly used on flash lights. As shown in Fig. 8, we may find it advisable to make use of a substantially half cup shaped reflector 40 engaged and held in position by the bulb and so shaped as to reflect a light through the end of the casing or through the hole in the front wall thereof.

From the foregoing description and a study of the drawings, it will be apparent that we have thus provided an extremely simple device which is convertible for use as an ordinary flash light or as a toilet article for illuminating the face to permit self inspection in the dark, the device being capable of having associated therewith batteries of varying dimensions whereby the device may be constructed and sold as a complete article with which may be associated any standard make of battery. It will be furthermore apparent that the device is extremely simple in construction and also in operation, and that there will be little likelihood of any derangement of the movable parts thereof.

While we have shown and described the preferred embodiment of the invention it will of course be readily understood that we reserve the right to make such changes in the form, construction, and arrangement of parts as will not depart from the spirit of the invention or the scope of the subjoined claims.

Having thus described our invention we claim:—

1. A device of the character described comprising a casing provided in one end wall with an opening and having its front wall provided with an opening adjacent said end wall, an illuminating device within said casing adapted to project light through said openings, and a slide member within said casing formed as a pair of right angularly extending plates bearing against said end and side walls, said plate being provided with openings adapted to register with said first named openings whereby upon movement of said slide either of said first named openings may be covered or uncovered.

2. A device of the character described comprising a casing provided in one end wall with an opening and having its front wall provided with an opening adjacent said end wall, a slide member within said casing formed as a pair of right angularly extending plates provided with holes adapted to register selectively with said first named holes, an illuminating device within said casing adapted to project light through said openings, and an extension formed on one of said plates and fixed adjacent said illuminating device whereby to serve as a reflector.

3. A device of the character described comprising a casing provided in one end wall with an opening and having its front wall adjacent said end wall provided with an opening, means for securing a dry battery within said casing, a plate member disposed within said casing and movable longitudinally therein, said plate member including a right angularly extending flange bearing against said front wall, said flange being provided with a pair of spaced slots, studs projecting from said front wall and engaging within said slots, a socket member formed on said plate and adapted for engagement by one of the contacts of said dry battery, an incandescent bulb disposed within said socket and positioned adjacent said openings, and a slide member movable transversely within said casing and provided with holes adapted to register with said first named opening whereby upon energization of said incandescent bulbs light may be emitted selectively from either of said first named openings.

In testimony whereof we affix our signatures.

ADOLPH N. FREED.
OSCAR E. FREED.